(12) United States Patent
Ohtomo

(10) Patent No.: US 8,380,393 B1
(45) Date of Patent: Feb. 19, 2013

(54) VARIABLY DIMMABLE WINDOW SYSTEM AND METHOD

(75) Inventor: Akitoshi Ohtomo, Seattle, WA (US)

(73) Assignee: The Boeing Company, Chicago, IL (US)

( * ) Notice: Subject to any disclaimer, the term of this patent is extended or adjusted under 35 U.S.C. 154(b) by 77 days.

(21) Appl. No.: 12/875,301

(22) Filed: Sep. 3, 2010

(51) Int. Cl.
*G06F 7/00* (2006.01)
(52) U.S. Cl. ........... 701/36; 250/221; 359/512; 359/601
(58) Field of Classification Search ........................ 701/36
See application file for complete search history.

(56) References Cited

U.S. PATENT DOCUMENTS

| | | | |
|---|---|---|---|
| 6,493,128 B1 | 12/2002 | Agrawal et al. | |
| 6,747,780 B2 | 6/2004 | Xu et al. | |
| 6,819,367 B1 | 11/2004 | Cava | |
| 7,355,161 B2 * | 4/2008 | Romig et al. | 250/221 |
| 7,505,136 B2 * | 3/2009 | Romig et al. | 356/432 |
| 7,679,809 B2 * | 3/2010 | Tonar et al. | 359/267 |
| 8,102,586 B2 * | 1/2012 | Albahri | 359/265 |
| 2008/0066971 A1 * | 3/2008 | Whang et al. | 178/18.01 |
| 2008/0239451 A1 * | 10/2008 | Mitchell et al. | 359/265 |

* cited by examiner

*Primary Examiner* — Thomas Tarcza
*Assistant Examiner* — Tyler J Lee
(74) *Attorney, Agent, or Firm* — Clifford G. Cousins

(57) ABSTRACT

A variably dimmable window system including a variably dimmable window having a light transmissivity; a controller in communication with the variably dimmable window, wherein the controller is configured to determine a target transmissivity to adjust the light transmissivity to correspond to the target transmissivity; and a navigational input in communication with the controller, wherein the target transmissivity is determined, in part, based on the navigational input. Methods for controlling the light transmissivity of a variably dimmable window mounted on a vehicle are also disclosed.

20 Claims, 4 Drawing Sheets

VARIABLY DIMMABLE WINDOW SYSTEM AND METHOD

FIELD

This application relates to variably dimmable windows and, more particularly, to control systems and methods for variably dimmable windows.

BACKGROUND

Windows are commonly used on vehicles to provide protection from the elements while preserving visual acuity. Several examples of vehicles that benefit from the use of windows include spacecraft, aircraft, automobiles, boats, motorcycles, and trucks.

Conventional windows have only a single transmissivity state. Specifically, conventional windows transmit virtually all incoming light regardless of the ambient conditions (e.g., rain or shine, dusk or dawn, or noon or night). Such single state windows may be optimized for use under certain circumstances, such as periods of low incoming light (e.g., when a vehicle is traveling away from the sun or at night). However, under other circumstances such as periods of high incoming light (e.g., when a vehicle is traveling toward the sun or instruments are reflecting backlighting from the sun), or transitional periods of lighting where a lighting level is changing rapidly (e.g., when flying at an altitude with intermittent cloud cover), a window with other transmissivity states may be desired to minimize operator discomfort and improve visual acuity.

In an effort to minimize operator discomfort and improve visual acuity, vehicles with conventional windows are typically provided with sun shades or sun visors. However, sun shades and sun visors offer only limited protection. For example, sun shades may reduce transmissivity, but they are not capable of adapting to changing light conditions. Sun visors also reduce transmissivity—perhaps to zero—but generally cover only a portion of the surface area of the window. As such, operators of vehicles with conventional windows commonly rely upon sun glasses in addition to sun shades and sun visors to manually manage incoming light.

In recent years, variably dimmable windows have been developed as an alternative to conventional windows. The transmissivity of a variably dimmable window can be controlled electronically, such as by controlling a voltage or electric field applied to the window. As such, variably dimmable windows present the opportunity to reduce or eliminate the need for mechanical devices, such as sun shades and sun visors, on vehicles. Variable dimmable windows also offer a potential for automation in order to reduce operator workload.

Accordingly, those skilled in the art continue with research and development efforts in the field of variably dimmable windows.

SUMMARY

In one aspect, a disclosed variably dimmable window system, mounted on a vehicle which includes a navigation system, may include: a variably dimmable window having a light transmissivity; a controller in communication with the variably dimmable window, with the controller being configured to determine a target transmissivity and to adjust the light transmissivity to correspond to the target transmissivity; and a navigational input in communication with the controller, wherein the target transmissivity is limited by the controller based on the navigational input.

In another aspect, a disclosed method for controlling the light transmissivity of a variably dimmable window mounted on a vehicle, the method including the steps of: obtaining a navigational input from a navigational system of the vehicle; determining a target transmissivity; determining whether a critical condition is present based on the navigational input; when a critical condition is present, limiting the target transmissivity to no less than a predetermined value; and adjusting the light transmissivity of the variably dimmable window to correspond to the target transmissivity.

In yet another aspect, a disclosed method for controlling the light transmissivity of a variably dimmable window, the method comprising the steps of: determining the position of the sun relative to the variably dimmable window; determining a target transmissivity based on the determined position; and adjusting the light transmissivity of the variably dimmable window to correspond to the target transmissivity.

Other aspects of the disclosed variably dimmable window system and method will become apparent from the following description, the accompanying drawings, and the appended claims.

DETAILED DESCRIPTION

Figure 1:
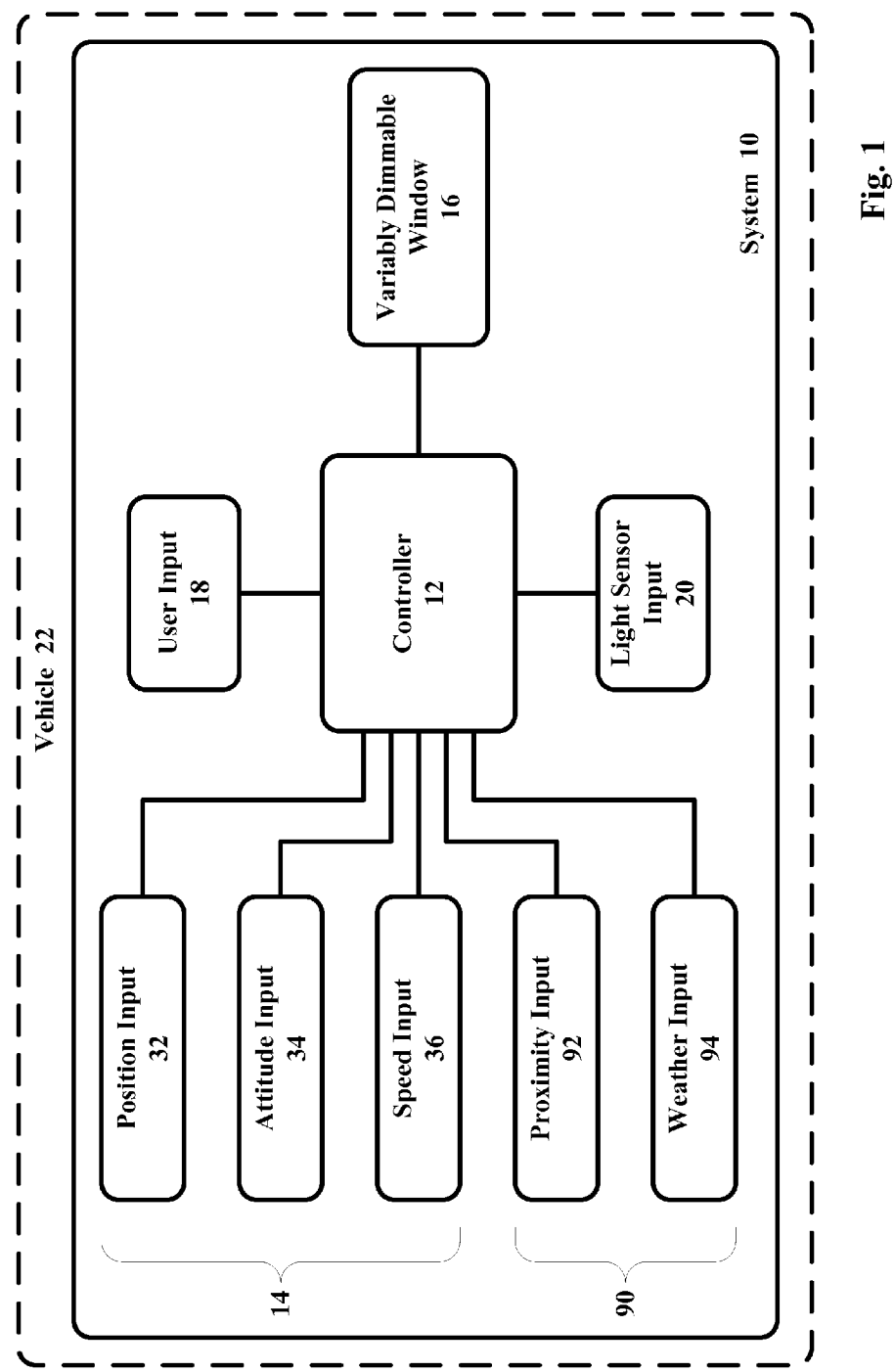
FIG. 1 is a block diagram depicting one aspect of the disclosed variably dimmable window system.
Figure 2:
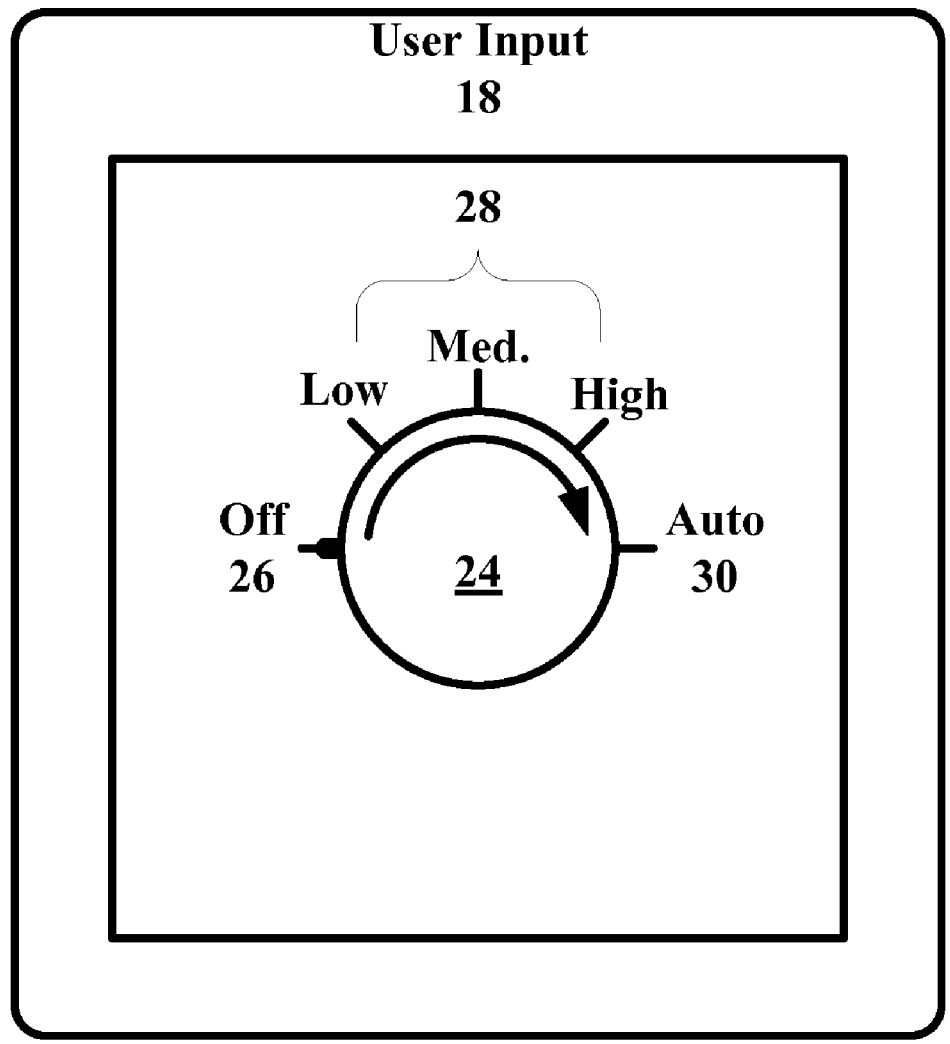
FIG. 2 is a schematic illustration of one implementation of the user input of the variably dimmable window system of FIG. 1.

Referring to FIG. 1, one aspect of the disclosed variably dimmable window system, generally designated 10, may include a controller 12, one or more navigational inputs 14 from a navigational system, and a variably dimmable window 16. Optionally, the variably dimmable window system 10 may additionally include a user input 18 and a light sensor input 20. Other additional components and systems may also be included in the variably dimmable window system 10 without departing from the scope of the present disclosure.

The variably dimmable window 16 may be any structure capable of transmitting light therethrough, wherein the light transmissivity of the structure may be varied electronically, such as by controlling the voltage or electric field applied to the structure. In one construction, the entire window 16 may be variably dimmable. In another construction, only a portion (e.g., the upper most portion) of the window 16 may be variably dimmable. In yet another construction, only select portions (e.g., the outer edges) of the window 16 may be variably dimmable.

The light transmissivity of the variably dimmable window 16 may be varied within a range spanning from a maximum transmissivity to a minimum transmissivity. The maximum transmissivity of the variably dimmable window 16 may depend on the construction of the window 16 and may correspond to a state of least tinting (dimming). For example, the maximum transmissivity of the variably dimmable window 16 may be about one hundred percent, corresponding to effectively no dimming. The minimum transmissivity of the variably dimmable window 16 may correspond to a state of maximum tinting (dimming). For example, the minimum transmissivity may be a transmissivity in the range spanning from about zero to about ninety percent. In one construction, minimum transmissivity may be set by the physical capabilities of the variably dimmable window 16. For example, the variably dimmable window 16 may not be capable of achieving a light transmissivity below about twenty percent. In another construction, minimum transmissivity may be limited to a pre-determined value. For example, a skilled artisan may determine that, for safety reasons, the light transmissivity should never drop below about forty percent.

In one particular application, the variably dimmable window 16 may be a window of a vehicle 22 including a navigational system, such as an airplane (e.g., the variably dimmable window 16 may be a cockpit window or passenger window) or an automobile (e.g., the variably dimmable window 16 may be a windshield or side window). Other windows (not shown) of the vehicle 22 may also be variably dimmable windows 16, individually or collectively controlled by the disclosed system 10.

In a first implementation, the variably dimmable window 16 may comprise a support structure (e.g., glass and/or polymer) and an electrochromic material. In one expression of the first implementation, the electrochromic material may be an electrochromic gel, such as the electrochromic gel used in the auto-dimming mirrors available from Gentex Corporation of Zeeland, Mich. In another expression of the first implementation, the electrochromic material may be an electrochromic thin-film, such as the electrochromic thin-film used in electrochromic glass available from Saint-Gobain Sekurit of Paris, France. In yet another expression of the first implementation, the electrochromic material may comprise one or more of the electrochromic materials described in U.S. Pat. No. 6,747,780, issued on Jun. 8, 2004, the entire contents of which are incorporated herein by reference.

In a second implementation, the variably dimmable window 16 may comprise a layer of suspended particles between one or more support layers, such as glass or polymer (e.g., poly(methyl methacrylate)). The orientation of the particles and, hence, the effective light transmissivity of the assembly may depend on the presence and extent of an electric field (or an applied voltage).

The user input 18 may provide an interface between a user (e.g., a pilot or driver) and the controller 12. For example, the user input 18 may include a rotating switch 24 that is moveable between an "Off" position 26, a manual position 28, and an "Auto" (i.e., automatic) position 30. In the "Off" position 26, the controller 12 sets or leaves the variably dimmable window 16 in a default transmissivity state. In one construction, the default transmissivity state is a light transmissivity state actively controlled by the controller without reference to any other input signal. In another construction, the default transmissivity state of the variably dimmable window 16 itself (i.e., without powered control by the controller 12) provides for maximum transmissibility so as to fail safe. In the manual position 28, the controller 12 may set the target transmissivity for the variably dimmable window 16 based on at least one pre-determined setting (e.g., "Low", "Med." (medium) and "High" dimming settings) selected by the user. In a variation, the controller 12 may set the target transmissivity for the variably dimmble window based on a setting within a pre-determined continuous range (e.g., from "Low" to "High") selected by the user. In the "Auto" position 30, the controller 12 determines the target transmissivity of the variably dimmable window 16 based on input signals including input signals received from the navigational inputs 14 and, optionally, a light sensor input 20. In a variation, the "Auto" position 30 may be supplemental to the manual position 28 (e.g., as a pushed or pulled displacement of the switch 24, or a separate switch (not shown), with the 'manual' position serving as an additional input signal indicative of a baseline target transmissivity, and the controller 12 determines the target transmissivity of the variably dimmable window 16 based the baseline target transmissivity (e.g., "Low", "Med." (medium) and "High" dimming) and input signals including input signals received from the navigational inputs 14 and/or the light sensor input 20.

The navigational inputs 14 may be inputs received from the various navigational systems of the vehicle 22. Therefore, the navigational inputs 14 may be present in a vehicle 22 regardless of whether the vehicle 22 is provided with the disclosed variably dimmable window system 10 or not. As such, the navigational inputs 14 may be inputs received from sensors and systems of the vehicle 22 with a primary purpose of facilitating the safe navigation of the vehicle 22. Use of such sensors and systems as the navigational inputs 14 of the disclosed variably dimmable window system 10 may be secondary to their primary navigational purpose.

In one particular implementation, the navigational inputs 14 may include a position input 32, an attitude input 34, and a speed input 36. In other implementations, fewer or additional navigational inputs 14 may be supplied to the controller 12. For example, an attitude input 34 can be approximated by an analysis of position input data versus time. For further example, a speed input 36 can be provided, or approximated by a similar analysis of position input data versus time.

The position input 32 may provide the controller 12 with an indication of the position of the vehicle 22 (e.g., latitude, longitude, and altitude). Optionally, the position input 32 may also be indicative of the approximate attitude and/or speed of the vehicle 22. As one example, when the vehicle 22 is an aircraft or automobile, the position input 32 may be supplied by a global positioning system ("GPS"). As another example, when the vehicle 22 is an aircraft, the position input 32 may be supplied by the aircraft's inertial navigation systems, with an altitude component supplied by the vehicle's pitot-static system.

The attitude input 34 may provide the controller 12 with an indication of the attitude of the vehicle 22 (e.g., pitch, roll, yaw, and heading). As one example, when the vehicle 22 is an aircraft, the attitude input 34 may be supplied by the aircraft's inertial reference unit ("IRU"). As another example, when the vehicle is an aircraft or automobile, the attitude input 34 may be supplied by gravity sensors and a magnetic compass.

The speed input 36 may provide the controller 12 with an indication of the speed (e.g., ground speed or airspeed) of the vehicle 22. As one example, when the vehicle 22 is an aircraft, the speed input 34 may be an airspeed supplied by a pitot-static system. As another example, when the vehicle is an aircraft or automobile, the speed input 34 may be a ground speed supplied by a wheel speed sensor or GPS. Thus, as an example, when the vehicle 22 is an aircraft, the navigational inputs 14 may be inputs received from the aircraft's avionics systems.

The optional light sensor input 20 may provide the controller 12 with an indication of the amount of light being transmitted through the variably dimmable window 16 or the effect of the transmitted light in the vicinity of the window. For example, the light sensor input 20 may be an input that is indicative of light intensity as determined by a light sensor positioned in the vehicle 22, such as in the cockpit of an aircraft. While not a navigational input 14, the light sensor input 20 may be used by the controller 12 in conjunction with the navigational inputs 14 to determine a target transmissivity of the variably dimmable window 16. For example, the light sensor input 20 may be used by the controller 12 to determine when light levels impinging upon the variably dimmable window 16 differ substantially from assumed light levels due to weather conditions (e.g., fog, haze, or dense cloud cover) or other phenomena.

The controller 12 may be in communication with the variably dimmable window 16, the navigational inputs 14, the optional light sensor input 20 (if included), and the user input 18, and may determine a target light transmissivity of the variably dimmable window 16 based on one or more of the navigational inputs 14, the optional light sensor input 20 (if included), and the user input 18. For example, the controller 12 may be or may include a processor (e.g., a computer) capable of receiving the inputs 14, 18, 20, calculating the relative position of the sun, and altering the light transmissivity of the variably dimmable window 16. As one example, once a target light transmissivity has been determined, the controller 12 may generate a command signal and may communicate the command signal to the variably dimmable window 16 such that the light transmissivity of the variably dimmable window 16 closely corresponds to (e.g., matches) the target transmissivity. As another example, the controller 12 may correlate the target transmissivity to a specific output to be applied to the variably dimmable window 16 (e.g., to a specific voltage) using, for example, a look-up table. As yet another example, the controller 12 may be part of a feed-back loop configured to minimize the difference between the light transmissivity of the variably dimmable window 16 and the target transmissivity.

Figure 3:
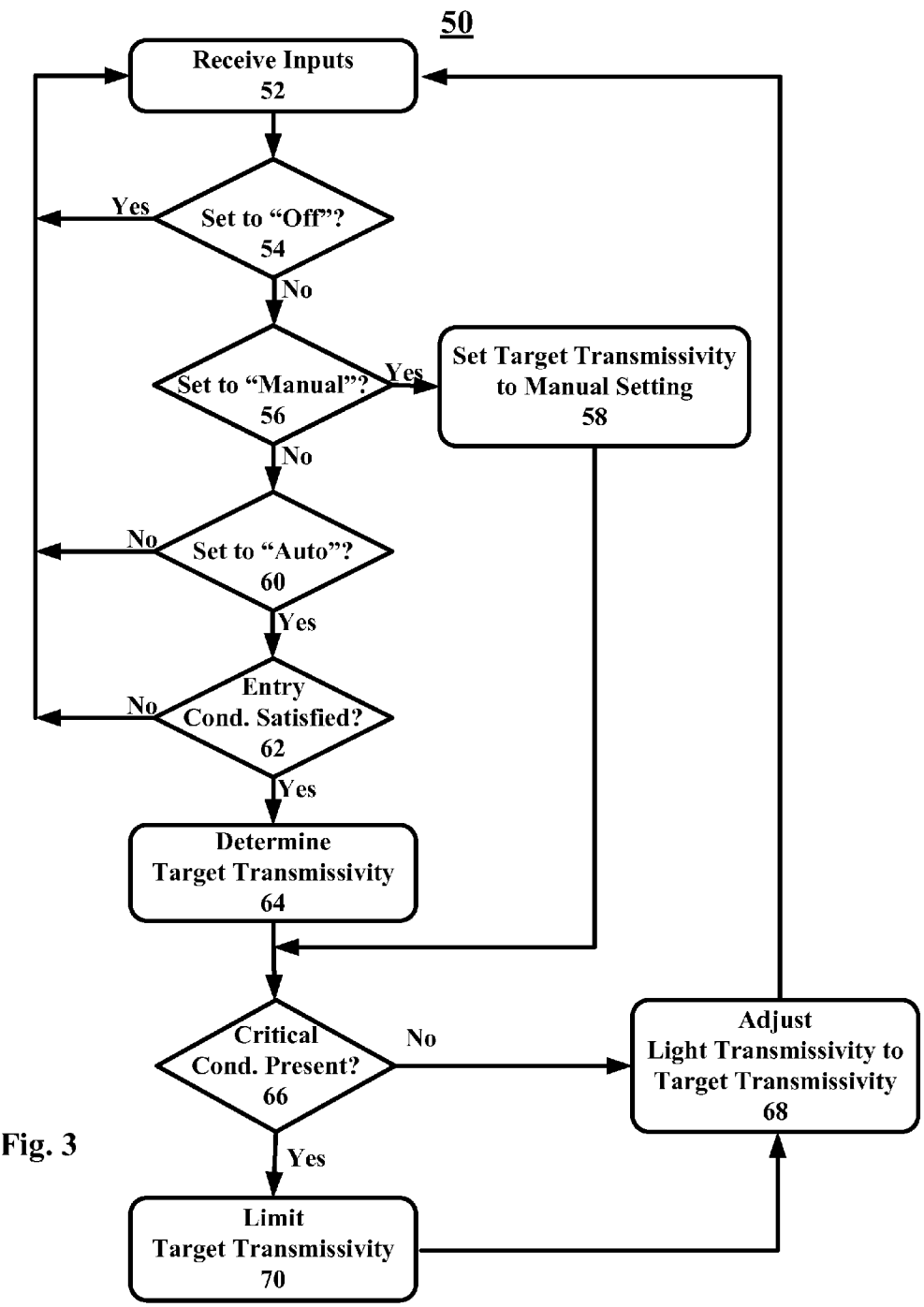
FIG. 3 is a flow chart illustrating one aspect of the disclosed method for controlling a variably dimmable window.

One aspect of the disclosed method for controlling the variably dimmable window 16 of the disclosed variably dimmable window system 10 is shown in FIG. 3 and is generally designated 50. The method 50 may begin at block 52 with the controller 12 receiving the user input 18, as well as the navigational inputs 14 and, optionally, the light sensor input 20.

At decision block 54, the controller 12 may query whether the user input 18 is set to the "Off" position 26. If the controller 12 determines that the user input 18 is set to the "Off" position 26, then the variably dimmable window 16 may remain in or be set to its default transmissivity state and the method 50 may return to block 52. However, if the controller 12 determines that the user input 18 is not set to the "Off" position 26, then the method 50 may proceed to decision block 56.

At decision block 56, the controller 12 may query whether the user input 18 is set to the manual position 28. If the controller 12 determines that the user input 18 is set to the manual position 28, then the controller 12 may set the target transmissivity for the variably dimmable window 16 based on the manual setting (e.g., "Low", "Med." (medium) and "High") selected by the user, as shown at block 58. However, if the controller 12 determines that the user input 18 is not set to the manual position 28, then the method 50 may proceed to decision block 60. In the aforementioned variation where the "Auto" position 30 is supplemental to the manual position 28, the controller 12 may instead determine that the user input 18 is set to the manual position 28 with or without additional setting of the "Auto" position 30, and proceed in a similar manner.

At decision block 60, the controller 12 may query whether the user input 18 is set to the "Auto" position 30. If the controller 12 determines that the user input 18 is not set to the "Auto" position 30, then the method 50 may return to block 52. However, if the controller 12 determines that the user input 18 is set to the "Auto" position 30, then the method 50 may proceed to optional decision block 62, or where the optional decision block is not employed, directly to block 64.

At decision block 62, the controller 12 may optionally query whether one or more logical entry conditions have been satisfied. The entry conditions may be predetermined conditions for operating the variably dimmable window system 10 in "Auto" mode (i.e., the controller 12 determines the target transmissivity of the variably dimmable window 16). The entry conditions may be compared against the navigational inputs 14.

In one particular implementation, the entry conditions may be dictated by safety considerations. For example, if the vehicle 22 is an aircraft, the entry conditions may be set such that the variably dimmable window system 10 cannot proceed in "Auto" mode while the aircraft is taxiing or during take-off. As a first specific example of an entry condition, the vehicle 22 must be traveling above a pre-determined speed (e.g., at or above 250 knots) or must have a speed of zero (e.g., the vehicle 22 must be parked). As a second specific example of an entry condition, the vehicle 22 must be at ground level or above a pre-determined altitude (e.g., 18,000 feet).

If the controller 12 determines that the entry conditions are not satisfied, then the method 50 may return to block 52. However, if the controller 12 determines that the entry conditions are satisfied, then the method 50 may proceed to block 64.

At block 64, the controller 12 may determine a target transmissivity of the variably dimmable window 16 using the navigational inputs 14 and/or the optional light sensor input 20. Various techniques may be used to determine the target transmissivity. In the aforementioned variation where the "Auto" position 30 is supplemental to the manual position 28, the controller 12 may use the 'manual' setting as an additional input signal indicative of a baseline target transmissivity. Then the method 50 may proceed to decision block 66.

In a first implementation, the target transmissivity may be determined based on the light sensor input 20. The use of a light sensor input to control light transmissivity is described in U.S. Pat. No. 7,355,161 issued on Apr. 8, 2008, the entire contents of which are incorporated herein by reference.

In a second implementation, the target transmissivity may be determined using one or more of the navigational inputs 14. Specifically, the target transmissivity may be determined by determining the position of the sun relative to the variably dimmable window 16 and setting the target transmissivity accordingly.

Figure 4:
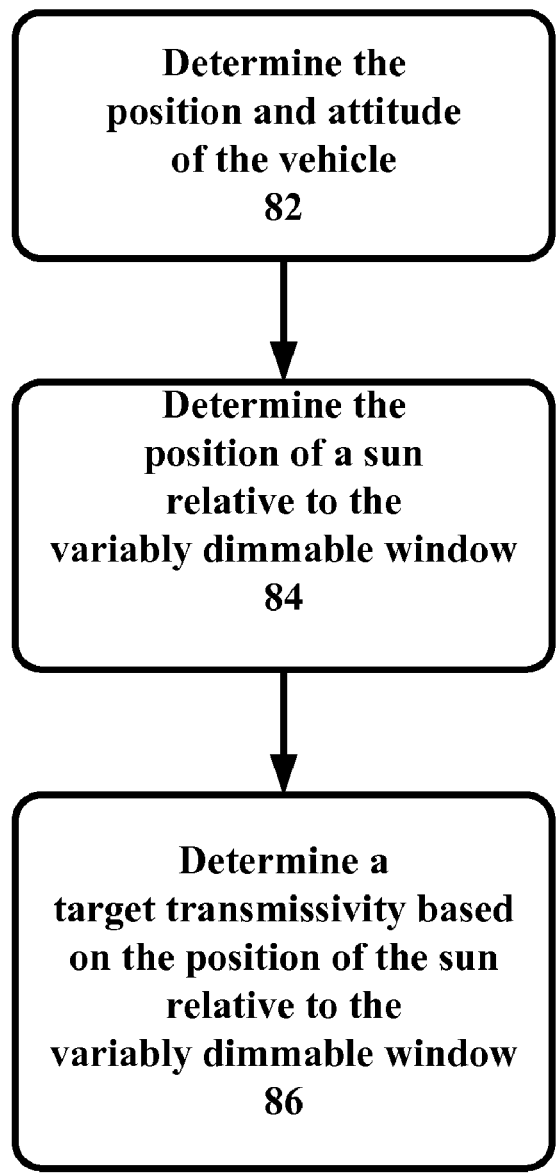
FIG. 4 is a flow chart illustrating one expression of the disclosed method for determining a target transmissivity of a window.

As shown in FIG. 4, one such method, generally designated 80, may include the step 82 of determining the altitude and the heading the vehicle 22. The altitude of the vehicle 22 may be received from the position input 32 and the heading of the vehicle 22 may be received from the attitude input 34, or an analysis of position input data versus time.

At step 84, the position of the sun may be determined relative to the variably dimmable window 16. The position of the sun may be determined, for example, using an ephemeris calendar, the position input 32 and the attitude input 34, and the date and time, which may be available from a persistent real-time clock or on-board computer such as a flight management system computer. For example, the position of the sun relative to the variably dimmable window 16 may be provided as an azimuth angle and an elevation angle.

At step 86, the target transmissivity may be determined based on the position of the sun relative to the variably dimmable window 16 (e.g., the determined azimuth and elevation angles of the sun). For example, the more the sun is aligned with the variably dimmable window 16, the lower the target transmissivity determined by the controller 12.

In a third implementation, the target transmissivity may be determined using both the navigational inputs 14 and the light sensor input 20.

At decision block 66, the controller 12 may query whether one or more critical conditions are present based on the navigational inputs 14 and one or more warning system inputs 90. In one implementation, a critical condition may be a predetermined condition under which it may be deemed inappropriate to continue operating the variably dimmable window system 10 with any level of transmissibility below a predetermined threshhold, as indicated in FIG. 3. In another implementation, a critical condition may be a predetermined condition under which it may be deemed inappropriate to continue operating the variably dimmable window system 10 in "Auto" mode with a level of transmissibility below a predetermined threshold, but allow for operation of the variably dimmable window system 10 with a manual setting (e.g., "Low", "Med." (medium) and "High" dimming settings) selected by the user.

Warning inputs 90 may include a proximity input 92 providing the controller 12 with an indication of the proximity of the vehicle 22 to other structures, such as other vehicles, geological structures, the ground, and the like. As one example, the proximity input 92 may be supplied by the vehicle's 22 radar. As another example, when the vehicle 22 is an aircraft, the proximity input 92 may be supplied by the aircraft's Terrain Awareness and Warning System ("TAWS"). As yet another example, when the vehicle 22 is an aircraft, the proximity input 92 may be supplied by aircraft's Airborne Collision Avoidance System ("ACAS").

Warning inputs 90 may include a weather input 94 providing the controller 12 with an indication of the location and type of weather-related features, such as clouds, turbulence, and windshear. For example, when the vehicle 22 is an aircraft, the weather input 94 may be supplied by the aircraft's weather radar ("WXR"). The term "warning inputs" is intended to be construed broadly, and may include vehicle configuration 'warnings' (e.g., flaps 30 and/or gear down, indicative of a landing configuration), attitude information 'warnings' (e.g., unusual attitude, such as a large pitch angle or, for ground vehicles, a loss of directional stability), and position information 'warnings' (e.g., vehicle movement through a special zone, such restricted or prohibited airspace or, for ground vehicles, a school zone).

As a first example, a critical condition may be a drop in altitude below a predetermined threshold value (e.g., 18,000 feet) (i.e., an position input 32 critical condition). As a second example, a critical condition may be a drop in speed below a predetermined threshold value (e.g., 250 knots) (i.e., a speed input 36 critical condition). As a third example, a critical condition may be the presence of a traffic advisory, resolution advisory, or ground proximity caution or warning (i.e., a proximity input 92 critical condition). As a fourth example, a critical condition may be the presence of a cloud, turbulence, or windshear in the path of the vehicle 22 (i.e., a weather input 94 critical condition). Other examples of critical conditions capable of being identified or determined using the navigational inputs 14 and warning inputs 90 will be apparent to those skilled in the art.

If the controller 12 determines that a critical condition is not present, then the method 50 may proceed to block 68. However, if the controller 12 determines that a critical condition is present, then the method 50 may proceed to block 70.

At block 70, the controller 12 may respond to the presence of a critical condition by limiting the target transmissivity of the variably dimmable window 16. In one expression, the controller 12 may respond to the presence of a critical condition by limiting the target transmissivity so that the target transmissivity is not less than a predetermined critical default value (e.g., maximum transmissivity). In another expression, the controller 12 may respond to the presence of a critical condition by limiting the target transmissivity so that the target transmissivity is not less than a predetermined value specific to the critical condition (or combination of conditions) present. For example, the presence of a traffic advisory may limit the target transmissivity to a predetermined value of maximum transmissivity, suitable for proximity events, while a drop in speed (i.e., speed below a threshold value) may limit the target transmissivity to a predetermined value of 80 percent of maximum transmissivity, suitable for flight condition events.

At block 68, the controller 12 may adjust the light transmissivity of the variably dimmable window 16 to the target transmissivity. In constructions where the default transmissivity state (i.e., the state where the user input 18 is in the "Off" position 26) is a light transmissivity state actively controlled by the controller 12, the controller may alternately adjust the light transmissivity of the variably dimmable window 16 to the default transmissivity.

Accordingly, the disclosed variably dimmable window system and method may facilitate the control of a variably dimmable window without the need for additional sensors, such as light sensors, by using the navigational and warning systems typically present on the vehicle. Furthermore, the disclosed variably dimmable window system and method may be configured to adapt to the dynamics of travel—not only to changing light conditions, but also to various situational conditions, such as mechanical issues, traffic and weather.

Although various aspects of the disclosed variably dimmable window system and method have been shown and described, modifications may occur to those skilled in the art upon reading the specification. The present application includes such modifications and is limited only by the scope of the claims.

What is claimed is:

1. A variably dimmable window system mounted on a vehicle including a navigation system, the system comprising:
   a variably dimmable window having a light transmissivity;
   a controller in communication with the variably dimmable window, wherein the controller is configured to determine a target transmissivity and to adjust the light transmissivity to correspond to the target transmissivity; and
   a navigational input, from the navigation system, in communication with the controller, wherein the target transmissivity is limited by the controller based on the navigational input.

2. The variably dimmable window system of claim 1, wherein the navigational input comprises at least one of an position input, an attitude input, and a speed input.

3. The variably dimmable window system of claim 1, wherein the target transmissivity is determined by the controller based on the navigational input.

4. The variably dimmable window system of claim 1, further comprising a light sensor input in communication with the controller, wherein the target transmissivity is determined by the controller based on both the navigational input and the light sensor input.

5. The variably dimmable window system of claim 1, further comprising a user input in communication with the controller, wherein the user input includes a manual setting, and the target transmissivity is determined by the controller based on the manual setting.

6. The variably dimmable window system of claim 1, further comprising a user input in communication with the controller, wherein the user input includes a manual setting and a supplemental automatic setting, and wherein, when the supplemental automatic setting is activated, the target transmissivity is determined by the controller based on both the navigational input and the manual setting.

7. A method for controlling a light transmissivity of a variably dimmable window mounted on a vehicle, the method comprising the steps of:
   obtaining a navigational input from a navigational system of the vehicle;
   determining a target transmissivity;
   determining whether a critical condition is present based on the navigational input;
   when the critical condition is present, limiting the target transmissivity to no less than a predetermined value; and
   adjusting the light transmissivity of the variably dimmable window to correspond to the target transmissivity.

8. The method of claim 7, wherein the target transmissivity is determined based on a light sensor input.

9. The method of claim 7, wherein the determining step further comprises the steps of:
   determining a position of a sun relative to the variably dimmable window based on the navigational input, wherein the navigational input includes both a position input and an attitude input; and
   determining the target transmissivity based on the position.

10. The method of claim 7, wherein the light transmissivity of the variably dimmable window ranges from a maximum transmissivity to a minimum transmissivity, and wherein the predetermined value is the maximum transmissivity.

11. The method of claim 7, wherein the light transmissivity of the variably dimmable window ranges from a maximum transmissivity to a minimum transmissivity, and wherein the predetermined value is between the maximum transmissivity and the minimum transmissivity.

12. The method of claim 7 wherein the navigational input comprises at least one of a position input, an attitude input, and a speed input.

13. The method of claim 12 further comprising the step of confirming the presence of a logical entry condition prior to the determining the target transmissivity step.

14. The method of claim 13 wherein the navigational input includes at least a position input, and wherein the logical entry condition depends upon at least one of a speed of the vehicle and an altitude of the vehicle.

15. The method of claim 7, further comprising the steps of:
   obtaining a warning input from a system of the vehicle; and
   determining whether a critical condition is present based on the warning input.

16. The method of claim 15, wherein the warning input comprises at least one of a proximity input and a weather input.

17. The method of claim 16, wherein the warning input includes at least a proximity input, and wherein the critical condition comprises a traffic advisory, a resolution advisory, or a ground proximity warning received from the proximity input.

18. The method of claim 16, wherein the warning input includes at least a weather input, and wherein the critical condition comprises a weather advisory received from the weather input.

19. A method for controlling a light transmissivity of a variably dimmable window, the method comprising the steps of:
   determining a position of a sun relative to the variably dimmable window;
   determining a target transmissivity based on the position; and
   adjusting the light transmissivity of the variably dimmable window to correspond to the target transmissivity.

20. The method of claim 19, further comprising:
   receiving a user input, said user input being used to further determine the target transmissivity.

* * * * *